Nov. 7, 1939.  C. W. SAVERY  2,178,920
METHOD FOR SLICING
Filed Jan. 24, 1938
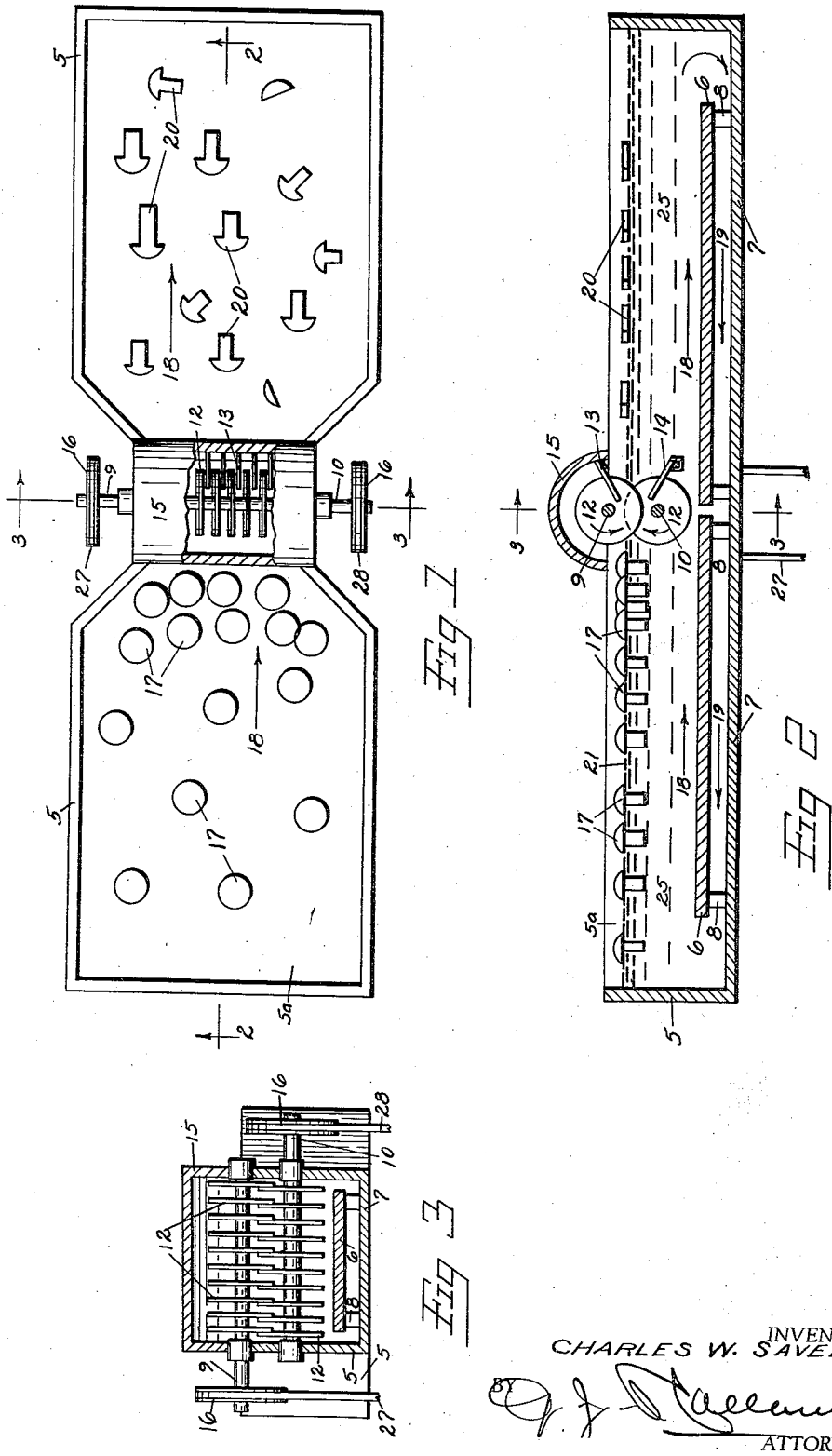
INVENTOR.
CHARLES W. SAVERY
ATTORNEY.

Patented Nov. 7, 1939

2,178,920

UNITED STATES PATENT OFFICE 2,178,920

METHOD FOR SLICING

Charles W. Savery, Denver, Colo.

Application January 24, 1938, Serial No. 186,599

2 Claims. (Cl. 146—219)

This invention relates to improvements in slicing machines, more particularly machines for slicing mushrooms for canning.

Certain grades of mushrooms are sliced and canned for market. The trade demands that such mushrooms be sliced vertically as this produces a superior slice that is generally preferred.

Various machines have been devised for slicing mushrooms but slicing by hand has been extensively used up to the time of the present invention, because difficulty has been encountered in mechanically holding the mushrooms erect to produce vertical slices.

It is an object of the present invention to provide a machine for slicing mushrooms vertically and automatically.

Another object is the provision of such a machine that will greatly speed the slicing operation with no damage to the tender mushrooms.

Other objects and advantages reside in details of design and construction that will be more fully disclosed in the following description and in the drawing in which:

Figure 1 is a plan view of a machine built according to the present invention;

Figure 2 is a longitudinal section on line 2—2 of Figure 1; and

Figure 3 is a cross section on line 3—3 of Figure 1.

In the drawing reference character 5 denotes a tank or trough having a removable sectional false bottom 6 that is supported in vertically spaced relation to the true tank-bottom 7, by spacers 8.

Across the tank, preferably positioned adjacent its longitudinal center, are journalled a pair of vertically spaced shafts 9 and 10 respectively, each carrying a series of horizontally spaced circular knives 12, positioned in upper and lower coacting, vertically overlapping pairs. A comb-like series of stationary fingers 13 is positioned so that the fingers are between the knives on the shaft 9 and a second similar series of fingers 14 is positioned to place fingers between the knives on the lower shaft 10. A hood of any convenient form such as shown at 15 is preferably placed over the knives and may be supported on the tank 5.

An outer end of each shaft is provided with means to transmit driving torque from suitable prime movers not shown, to the shafts which turn in opposite directions of rotation as indicated by the arrows. V-pulleys 16 have been shown as mounted on the shafts to receive torque from belts 27 and 28 respectively that run in opposite directions. Or the shafts can be spur-geared together and one belt can drive either shaft and thus the desired opposite directions of rotation can be effected.

Operation

In use, an operator fills the tank 5 with water 25 to a predetermined level 21. Next mushrooms 17 are fed into an end of the tank as at 5a. As the knives, which are preferably keenly sharp and made of stainless steel to prevent rust, rotate in the directions of meshing gears, the water is caused to flow in a current as indicated by arrows 18. The water returns in a closed cycle of flow under the false tank-bottom 6 as shown by arrows 19.

Mushrooms normally float with their heads or buttons up and their stems down as illustrated in Figure 1. The current of water floats the erect mushrooms into cutting-engagement with the knives which are spaced horizontally in closely coacting pairs, each pair comprising an upper and a lower knife. The pairs of coacting knives are spaced a distance to equal the desired thickness of a mushroom slice. The keen knives slice the mushrooms as they float through the knife assemblies and an optimum result is thus effected. The sliced product floats on the water surface at the discharge side of the knives as indicated at 20. Obviously, machines built according to this invention can be used for slicing or cutting other fruits, vegetables or the like, that can be floated.

The sectional construction of the false bottom 6, permits it to be removed from the tank or trough 5 for cleaning purposes. The stationary fingers 13 and 14 prevent slices or pieces of the mushrooms from remaining between the knives.

What I claim and desire to secure by Letters Patent is:

1. The method of slicing mushrooms or the like which consists in floating the mushrooms in a moving flow of liquid in vertical position to and through a slicing zone while simultaneously operating knives in closely spaced relation in vertical planes in said zone to vertically slice the mushrooms.

2. The method of slicing mushrooms or the like which consists in floating the mushrooms in a moving flow of liquid in vertical position to and through a slicing zone while simultaneously rotating knives in opposite directions in vertical planes in said zone to vertically slice the mushrooms.

CHARLES W. SAVERY.